(12) United States Patent
Doughty et al.

(10) Patent No.: US 10,127,790 B2
(45) Date of Patent: Nov. 13, 2018

(54) LEAK DETECTOR

(71) Applicant: WATTS REGULATOR, INC., North Andover, MA (US)

(72) Inventors: Jason W. Doughty, Fitschburg, MA (US); Peter P Bouchard, Ayer, MA (US); Paul J. Lake, Waltham, MA (US); Joseph M. Burke, Deerfield, NH (US)

(73) Assignee: Watts Regulator Co., North Andover, MA (US)

( * ) Notice: Subject to any disclaimer, the term of this patent is extended or adjusted under 35 U.S.C. 154(b) by 15 days.

(21) Appl. No.: 15/465,706

(22) Filed: Mar. 22, 2017

(65) Prior Publication Data

US 2017/0278372 A1   Sep. 28, 2017

Related U.S. Application Data

(60) Provisional application No. 62/311,761, filed on Mar. 22, 2016.

(51) Int. Cl.
| | |
|---|---|
| *G08B 21/00* | (2006.01) |
| *G08B 21/12* | (2006.01) |
| *G01F 1/56* | (2006.01) |
| *G01M 3/18* | (2006.01) |
| *E03B 7/07* | (2006.01) |
| *G08B 21/18* | (2006.01) |

(52) U.S. Cl.
CPC .............. *G08B 21/12* (2013.01); *E03B 7/077* (2013.01); *E03B 7/078* (2013.01); *G01F 1/56* (2013.01); *G01M 3/184* (2013.01); *G08B 21/182* (2013.01)

(58) Field of Classification Search
CPC ...... G08B 21/12; G08B 21/18; G08B 21/182; G01M 3/16; G01M 3/184; G01M 3/2815; G01M 3/3254; E03B 7/077; E03B 7/078
USPC ......................................... 340/603, 605, 606
See application file for complete search history.

(56) References Cited

U.S. PATENT DOCUMENTS

| | | | |
|---|---|---|---|
| 3,069,671 | A | 12/1962 | Taylor |
| 3,473,553 | A | 10/1969 | Collins |
| 3,770,002 | A | 11/1973 | Brown |
| 3,824,460 | A | 7/1974 | Gustafson |

(Continued)

FOREIGN PATENT DOCUMENTS

WO    2010/030838    3/2010

OTHER PUBLICATIONS

European Search Report for European Patent Application No. 17162293.9 dated Aug. 25, 2017, 8 pages.

*Primary Examiner* — Adnan Aziz
(74) *Attorney, Agent, or Firm* — Burns & Levinson LLP; George N. Chaclas; Richard B. Emmons

(57) ABSTRACT

A leak detector assembly for use with a backflow prevention device includes a housing defining a passageway for receiving a fluid. A flap assembly couples to the housing for generating a low flow error signal indicating minimal fluid passing through the passageway and a fully actuated error signal indicating significant fluid passing through the passageway. The flap assembly includes a flap mounted in the passageway such that significant flow of the fluid moves the flap to generate the fully actuated error signal. The flap assembly also includes a sensing element on the flap to determine a presence of the fluid without movement of the flap to generate the low flow error signal based on a low flow of the fluid.

16 Claims, 7 Drawing Sheets

(56) References Cited

U.S. PATENT DOCUMENTS

| | | | |
|---|---|---|---|
| 4,297,686 A | 10/1981 | Tom | |
| 4,324,268 A | 4/1982 | Jacobson | |
| 4,429,343 A | 1/1984 | Freud | |
| 4,572,113 A | 2/1986 | Baughman | |
| 4,675,596 A | 6/1987 | Smith | |
| 4,677,371 A | 6/1987 | Imaizumi | |
| 4,683,904 A | 8/1987 | Iltis | |
| 4,747,364 A * | 5/1988 | Horowitz | B01D 46/0086 116/267 |
| 4,804,947 A | 2/1989 | Geleziunas | |
| 4,845,472 A | 7/1989 | Gordon et al. | |
| 4,901,751 A * | 2/1990 | Story | F16K 37/00 137/312 |
| 4,944,253 A | 7/1990 | Bellofatto | |
| 5,081,422 A | 1/1992 | Shih | |
| 5,188,143 A | 2/1993 | Krebs | |
| 5,287,086 A | 2/1994 | Gibb | |
| 5,345,224 A | 9/1994 | Brown | |
| 5,507,178 A | 4/1996 | Dam | |
| 5,546,009 A | 8/1996 | Raphael | |
| 5,632,302 A | 5/1997 | Lenoir, Jr. | |
| 5,655,561 A | 8/1997 | Wendel et al. | |
| 5,844,492 A | 12/1998 | Buffin, Sr. | |
| 5,857,482 A | 1/1999 | Dowling et al. | |
| 5,877,689 A | 3/1999 | D'Amico | |
| 6,003,536 A | 12/1999 | Polverari et al. | |
| 6,009,762 A * | 1/2000 | Ockleston | G01F 1/002 73/861.71 |
| 6,025,788 A | 2/2000 | Diduck | |
| 6,035,699 A | 3/2000 | Parlante | |
| 6,084,520 A | 7/2000 | Salvucci | |
| 6,276,309 B1 | 8/2001 | Zeek | |
| 6,335,690 B1 | 1/2002 | Konchin et al. | |
| 6,369,714 B2 | 4/2002 | Walter | |
| 6,445,565 B1 | 9/2002 | Toyoda et al. | |
| 6,489,895 B1 | 12/2002 | Apelman | |
| 6,499,961 B1 | 12/2002 | Wyatt et al. | |
| 6,552,647 B1 | 4/2003 | Thiessen et al. | |
| 6,639,517 B1 | 10/2003 | Chapman et al. | |
| 6,741,179 B2 | 5/2004 | Young | |
| 6,950,032 B1 | 9/2005 | Hewitt et al. | |
| 7,032,435 B2 | 4/2006 | Hassenflug | |
| 7,082,959 B1 | 8/2006 | Franklin | |
| 7,292,155 B2 | 11/2007 | Vokey et al. | |
| 7,299,819 B1 * | 11/2007 | Fenton | F17D 5/02 137/460 |
| 7,549,435 B2 | 6/2009 | Walter | |
| 7,605,710 B2 | 10/2009 | Crnkovich et al. | |
| 7,753,071 B2 | 7/2010 | Wood | |
| 8,578,770 B2 * | 11/2013 | Cantolino | G01F 23/242 73/290 R |
| 8,850,872 B2 * | 10/2014 | Jarvie | G01M 3/2892 137/409 |
| 9,146,172 B2 * | 9/2015 | Trescott | G01M 3/002 |
| 9,265,980 B2 * | 2/2016 | Johnson | A62C 35/68 |
| 2002/0101355 A1 | 8/2002 | Young | G01F 1/26 340/606 |
| 2003/0066340 A1 * | 4/2003 | Hassenflug | G01F 1/28 73/46 |
| 2003/0231024 A1 | 12/2003 | Luque | |
| 2005/0255724 A1 | 11/2005 | Picco et al. | |
| 2008/0179962 A1 * | 7/2008 | Wood | G01M 3/16 307/98 |
| 2010/0064773 A1 * | 3/2010 | Meredith | G01M 3/047 73/40 |
| 2010/0095744 A1 * | 4/2010 | Johnson | E03D 1/00 73/40.5 R |
| 2011/0132474 A1 * | 6/2011 | Reese | E03F 7/04 137/487.5 |
| 2013/0314235 A1 * | 11/2013 | Rogers | G08B 21/182 340/616 |
| 2015/0348395 A1 * | 12/2015 | Trout | G08B 21/20 340/605 |
| 2016/0049067 A1 * | 2/2016 | Hyland | G08B 25/08 340/517 |
| 2016/0083953 A1 * | 3/2016 | Caux | E03F 7/04 137/2 |

* cited by examiner

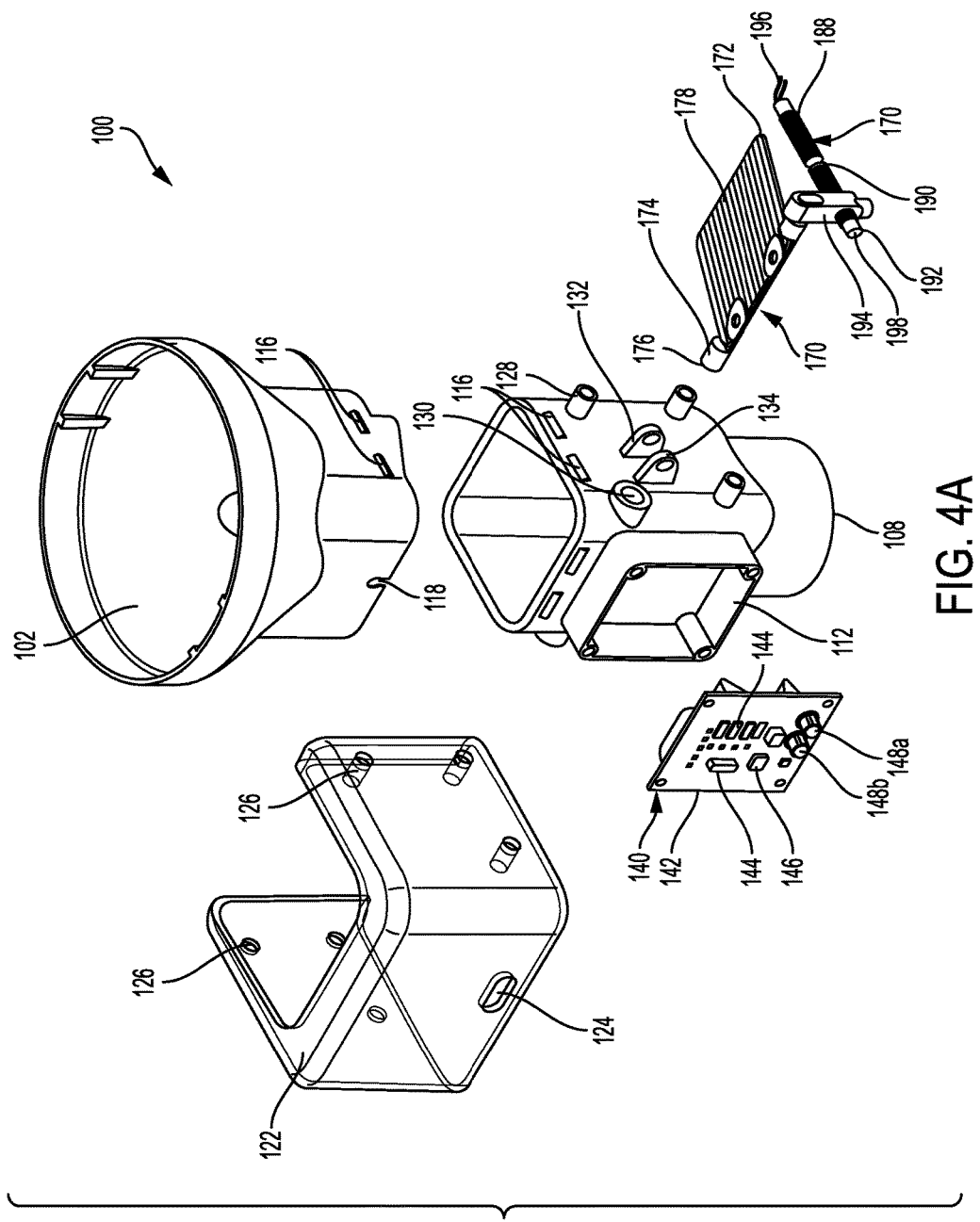

LEAK DETECTOR

CROSS-REFERENCE TO RELATED APPLICATION

This application claims priority to U.S. Provisional Patent Application No. 62/311,761, filed Mar. 22, 2016, which is incorporated herein by reference.

BACKGROUND OF THE INVENTION

1. Field of the Invention

The subject disclosure relates to leak detectors, and more particularly to leak detectors for backflow prevention devices in water systems.

2. Background of the Related Art

Generally, backflow is any unwanted reversal of the flow of liquids, solids, or gases in a piping system such as a fire protection system. For another example, backflow in an irrigation application is when water from the sprinkler system travels "upstream" through the pipes and enters the potable water system through a cross-connection. A cross-connection is any connection between a potable (drinkable) water system and any system containing non-potable water, pollutants, or toxins. An example of where a cross-connection would exist is when a home's external tap has a hose connected that runs into a pool, which is elevated above the home's water tank.

Backpressure can also create undesirable contamination. Backpressure is when the pressure downstream of the backflow devices exceeds the supply (or upstream) pressure. Backpressure can occur if the supply pressure is reduced, or if the pressure downstream is increased. Back siphonage can also create contamination. Back siphonage occurs when a vacuum is created upstream of the backflow device, and water is literally sucked back up the system. Back siphonage can happen when the water supply is stopped due to a water main break or nearby fire hydrant use.

In view of the above, many types of backflow prevention devices have been designed to prevent contaminants from entering potable water systems. Backflow prevention devices are used in all types of premises, whether industrial, commercial or residential. Backflow prevention devices help protect the public safety by preventing potable water contamination in such critical areas as municipal water systems, food processing plants, medical and dental water supplies, and many industrial applications. The Safe Drinking Water Act, signed into law in 1974, placed the responsibility of local governments and water authorities for drinking water protection to promote public health and safety. As a result, most building codes and prudent designers require backflow prevention devices.

There are multiple types of backflow prevention devices or back flow preventers, the three most common being the pressure vacuum breaker (PVB), the reduced pressure zone (RPZ), and the double check assembly (DCA). These are all installed in the water system immediately after the isolation valve. There is a fourth backflow preventer which is also fairly common; the atmospheric vacuum breaker (AVB), which is installed on each zone of the sprinkler system, immediately after the zone control valve. Each type of backflow device is designed to provide a different level of protection for varying commercial or residential applications. For example, hospitals and morgues, which handle large quantities of hazardous wastes on a daily basis, require much heavier-duty backflow preventers than a residential irrigation system. Several backflow prevention devices are available at watts.com/backflowprevention.

One phenomenon of some backflow prevention devices is the occasional ejection of some water or even the release of a significant amount of water. For example, a pressure fluctuation where a building pressure rises above the main pressure may cause momentary backflow that is released by the backflow prevention device. In another more dramatic circumstance, the main pressure drop may be sustained, which could result in the water within a building being dumped to drain to prevent backflow contamination. For a tall building, this could be a significant amount of water at a large flow rate.

To accommodate water released from backflow prevention devices, systems are usually designed so that the released water goes to drain. However, the drain system may be insufficient, blocked or even non-existent. Often, the drain system has an inlet funnel for catching the released water. Such inlet funnels usually maintain an air gap to the water system, again for preventing cross-connection and, thereby, a potential source of contamination.

SUMMARY OF THE INVENTION

In view of the above, a need exists for a leak detector that couples to the water system for detecting small and large releases of backflow. The present disclosure is directed to a leak detector assembly for use with a backflow prevention device including a housing defining a passageway for receiving a fluid. A flap assembly couples to the housing for generating a low flow error signal indicating minimal fluid passing through the passageway and a fully actuated error signal indicating significant fluid passing through the passageway. The flap assembly includes a flap mounted in the passageway such that significant flow of the fluid moves the flap to generate the fully actuated error signal. The flap assembly also includes a sensing element on the flap to determine a presence of the fluid without movement of the flap to generate the low flow error signal based on a low flow of the fluid.

The leak detector assembly may also include a printed circuit board for processing at least one of the fully actuated error signal and the low flow error signal. A main controller can connect to the printed circuit board for providing communication of the signals and storing a date, time and duration of each signal. The communication may be wireless such as through a wireless local area network, the Internet, cellular networks and the like. The communication may also be wired such as into a LAN or the Internet by Ethernet cable and the like. In one embodiment, the flap assembly includes a magnet coupled to the flap for rotation therewith and a fixed magnetic sensor such that the fully actuated error signal is generated based upon the magnet moving away from the fixed magnetic sensor. One of the magnet and the fixed magnetic sensor is mechanically adjustable to adjust a trip level for the fully actuated error signal. Typically, the flap is mounted for 90° of rotation in the housing. The flap can also be mounted at an angle so that fluid does not easily collect thereon. For example, the flap may be at a 45 angle with respect to horizontal. The sensing element is preferably co-planar inter-digitated conductive traces connected to a printed circuit board. In one embodiment, an application specific printed circuit board receives at least one signal from the leak detector assembly, determines a comparison of the at least one signal to a predetermined threshold, and generates an alarm based upon the comparison.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

FIGS. 4A and 4B are exploded views of a leak detector assembly in accordance with the subject disclosure.

DETAILED DESCRIPTION OF PREFERRED EMBODIMENTS

Figure 1:
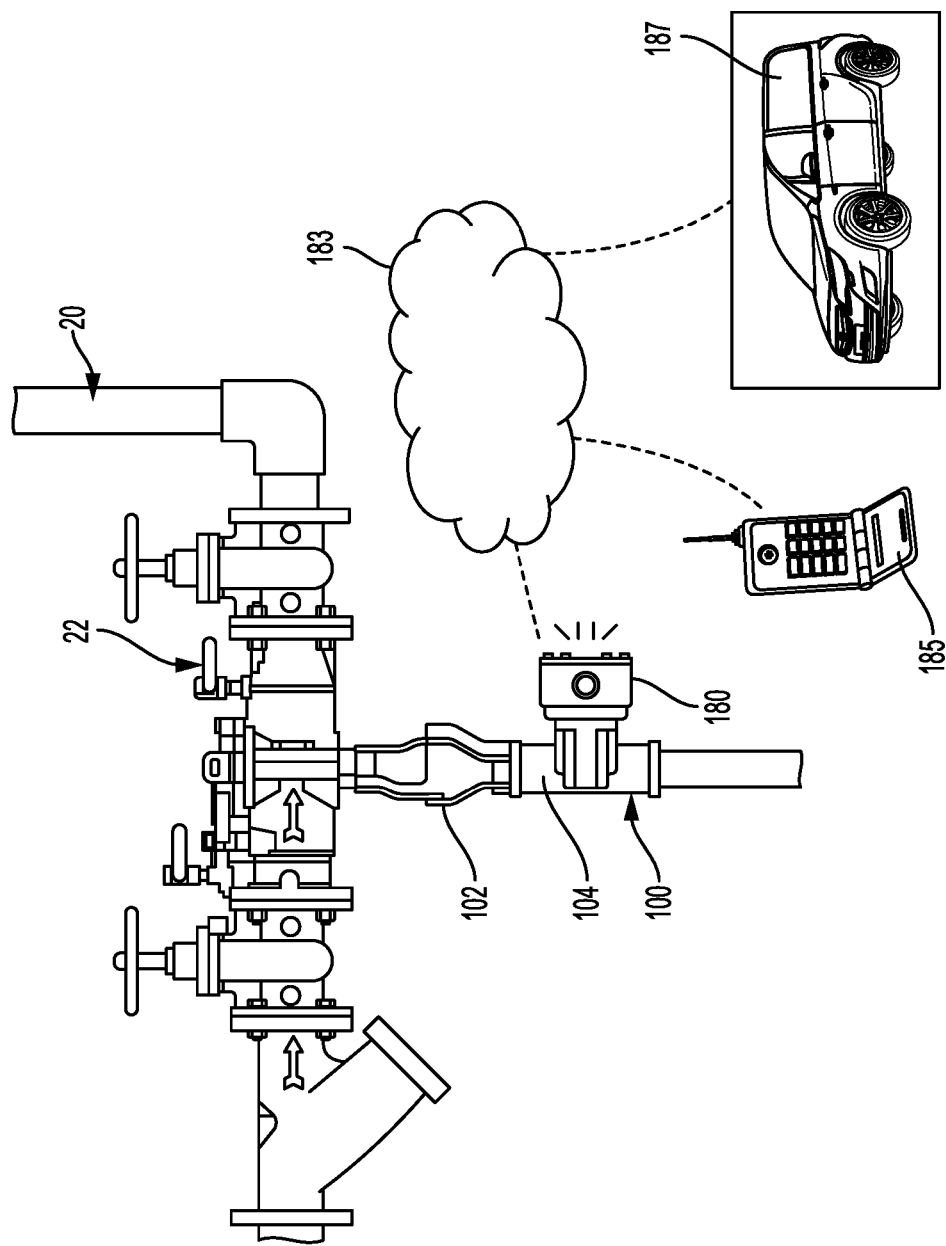
FIG. 1 is a schematic illustration of a leak detector assembly connected to a portion of a building piping network in accordance with the subject disclosure.

The subject technology overcomes many of the prior art problems associated with water discharge from backflow prevention devices. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Terms such as lower, upper, right and left are used in reference to the figures for convenience and not meant in a limiting manner.

Referring now to FIG. 1, there is shown a schematic illustration of a leak detector assembly 100 connected to a portion of a building piping network 20. The piping network 20 has a backflow prevention assembly 22. The backflow prevention assembly 22 may be a double check detector assembly, Model 007DCDA, available from Watts Water Technologies, Inc. at watts.com. A leak detector assembly 100 may couple to the backflow prevention assembly 22 or simply be placed below the backflow prevention assembly 22 in a location to capture fluid released by the backflow prevention assembly 22.

The leak detector assembly 100 generates signals indicating three different conditions to a main controller 180. The three different conditions are: "normal," which indicates that the backflow prevention device 22 is not discharging water; "low flow error," which indicates that the backflow prevention device 22 is discharging or has recently discharged a small amount of water; and "fully actuated error," which indicates that the backflow prevention device 22 is actively discharging a significant amount of water.

Figure 2:
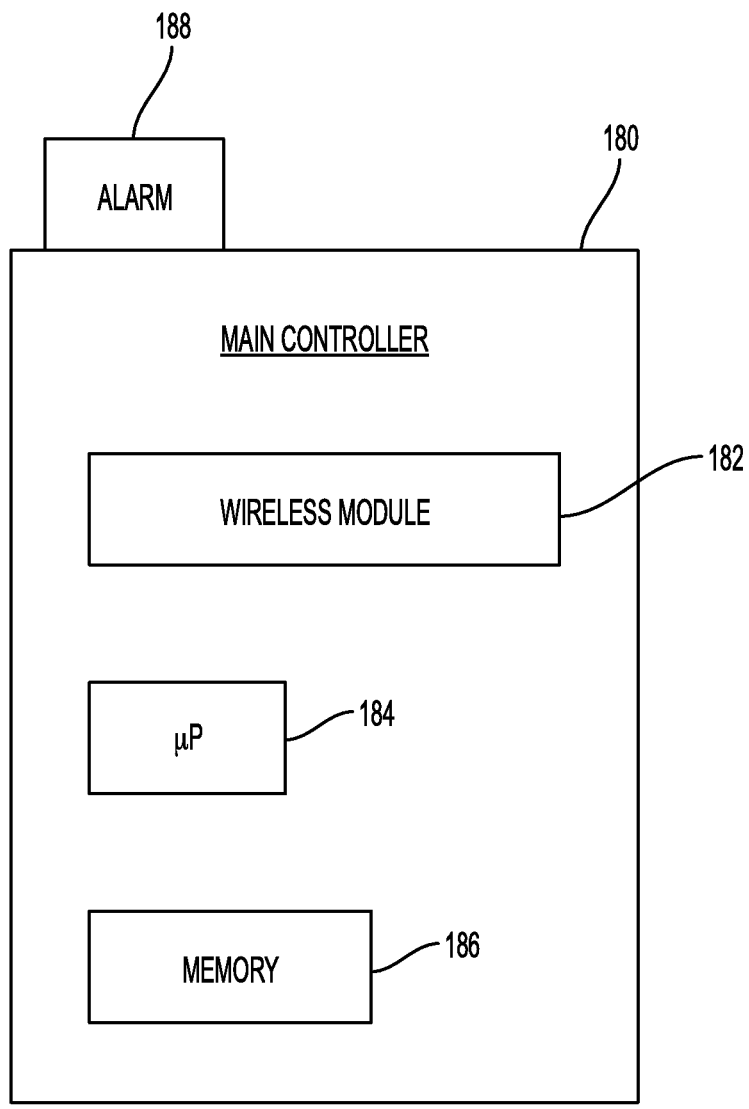
FIG. 2 is a schematic illustration of a main controller in accordance with the subject disclosure.

Referring now to FIG. 2, a schematic illustration of a main controller 180 in accordance with the subject disclosure is shown. The main controller 180 may be hardwired to the leak detector assembly 100 as shown. However the communication may be wireless via a Bluetooth or similar wireless module 182. The incoming signals are processed and stored by a microprocessor 184 and memory 186. The main controller 180 has an alarm module 188 for providing various alarms such as lights and/or sounds as desired for the low flow and fully actuated error conditions. The alarm module 188 may contain a light stalk and alarm horn. The main controller 180 may also control operation of the associated fluid system to address valve failure and prevent further leakage and/or flow as the case may be. In one embodiment, the main controller 180 contacts a service representative by email, text, or voicemail to a telephone 185 (see FIG. 1) to inform the service technician of the condition(s). The main controller 180 may be battery operated and/or connected to building power.

It is envisioned that data from the memory 186 can be downloaded to generate reports indicating conditions that have been triggered (e.g., low flow and fully actuated error conditions) along with the date and time of such conditions. As such, performance data can be collected and stored in the memory 186 for analysis. The memory 186 can also store threshold values. For example, the memory 186 can store time limits, a counter indicating the number of times that a signal was generated, and the like. It is envisioned that an application specific printed circuit board can encompass some or all of the functionality of the controller. The application specific printed circuit board can receive signals from the leak detector assembly, determine a comparison of the signals to predetermined thresholds and other information, and generate and/or send one or more alarms based upon the comparison. The alarms can be a flashing light, sound, a text message and the like.

In one embodiment, the controller 180 determines if maintenance is needed based upon the collected data. Preferably, the main controller 180 provides notifications of status and maintenance using a wireless module 182 to communicate with a network 183. The network 183 may be a local area network or the like connected to the Internet. The communication may be wired or wireless across any technological platform now known and later developed. The notifications and maintenance information can be provided directly to technicians such as by text to a technician telephone 185 and/or to a company representative having a maintenance van 187, and the like.

Figure 3:
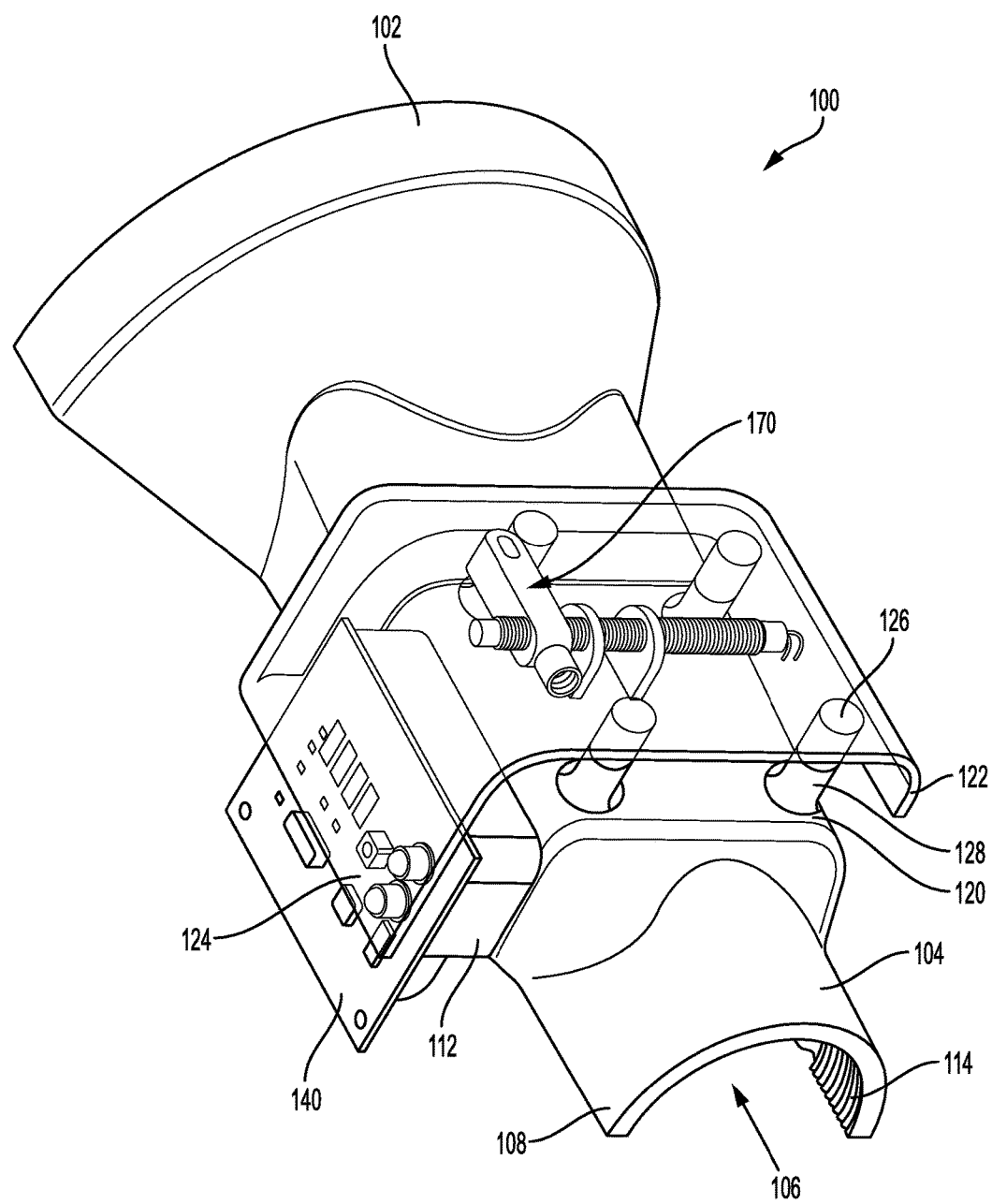
FIG. 3 is a perspective view of a leak detector assembly in accordance with the subject disclosure.

Referring now to FIG. 3, a perspective view of the leak detector assembly 100 is shown. The leak detector assembly 100 includes an upper inlet funnel 102 for capturing water discharged from the backflow prevention device. The inlet funnel 102 couples to a housing 104 that defines a passageway 106 through which the discharged water also passes. Typically, a lower end 108 of the housing 104 aligns with a system drain (not shown) so that discharged water passes into the drain.

In one embodiment, there are air gaps so that the inlet funnel 102 and lower end 108 do not contact the system plumbing. Alternatively, the inlet funnel 102 and/or the lower end 108 may be further connected to a piping system in a fluid tight manner for handling and removal of the discharged water. The lower end 108 has inner threads 114 for such connection.

The housing 104 includes an electrical box 112 for receiving a printed circuit board (pcb) assembly 140, which is a slightly alternative configuration as compared to FIG. 1. The housing 104 has a central portion 120 with a flapper assembly 170 partially mounted therein. The central portion 120 is square in cross-section. The flapper assembly 170 and the pcb assembly 140 are in electrical communication. In short, depending upon the position of the flapper assembly 170, the pcb assembly 140 generates the proper condition signal to be passed along to the main controller 180, wherever it may be.

A cover 122 mounts on the housing 104 to protect the pcb assembly 140 and the flapper assembly 170. The cover 122 may be clear, semi-transparent or opaque. In any case, the cover 122 defines a window 124 so that the pcb assembly 140 may be seen. The cover 122 defines a plurality of mounting bores 126 that align with threaded shoulders 128 on the housing 104 so that the cover 122 can be screwed to the housing 104. The inlet funnel 102, housing 104 and cover 122 may all be fabricated from the same or different materials. The materials may be metal, plastic, ceramic and the like now known and later developed.

Figure 4B:
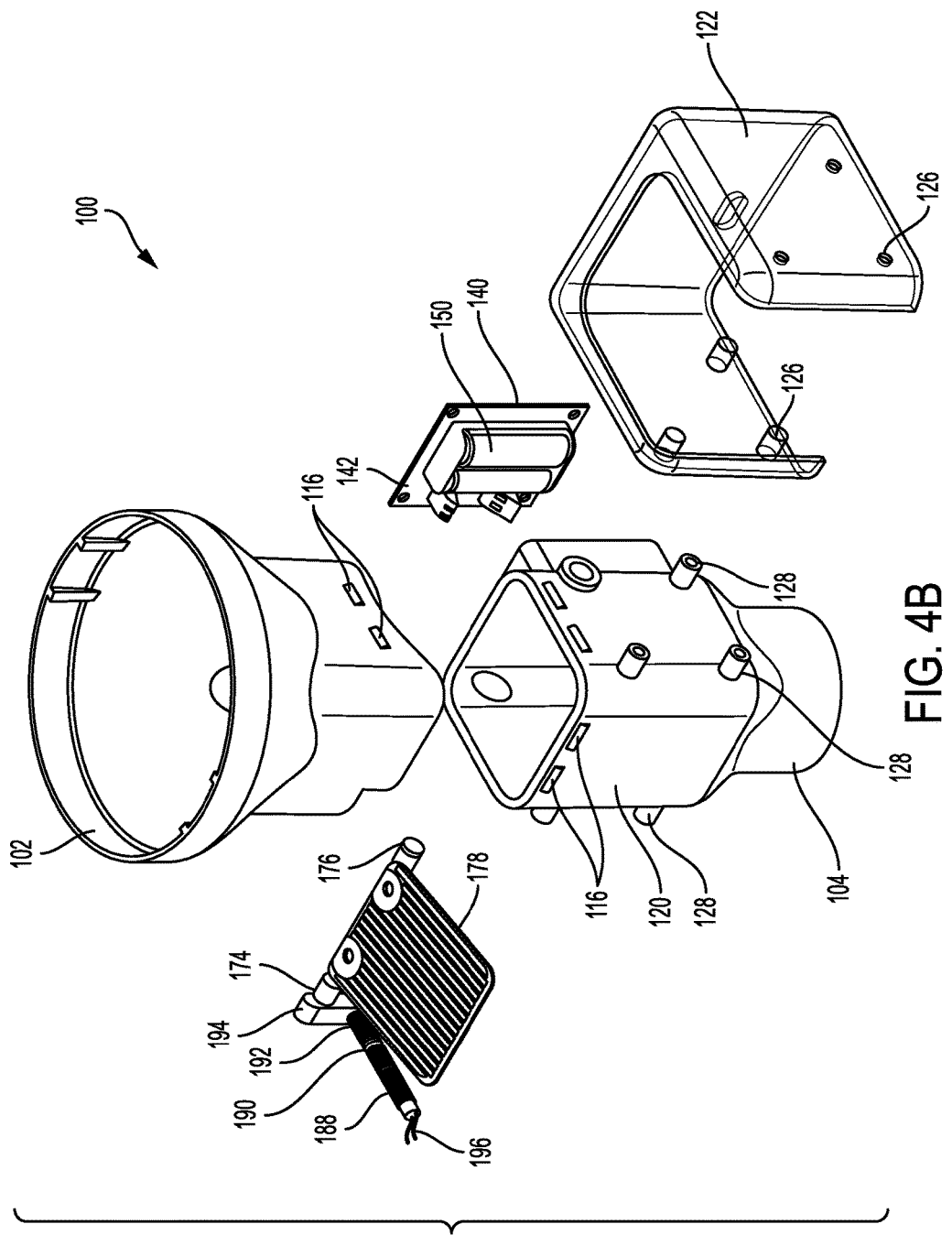

Referring now to FIGS. 4A and 4B, exploded views of the leak detector assembly 100 are shown. The pcb assembly 140 includes a printed circuit board (pcb) 142 mounted to the electrical box 112 with fasteners (not shown). The printed circuit board 142 has a plurality of integrated circuit (IC) chips 144 and other electronic devices 146 mounted thereon. The IC chips 144 may accomplish the functionality of the microcontroller 180 in whole or in part. The other electronic devices 146 may be capacitors, resistors, and like components necessary for the operation of the leak detector assembly 100 as described herein. In particular, the printed circuit board 142 has a yellow light emitting diode (LED) 148a and a red LED 148b for visually indicating the low flow and fully actuated error conditions, respectively. The pcb assembly 140 also includes two batteries 150 that may power the pcb assembly 140 or simply provide battery backup.

Features 116 on the housing 104 allow the inlet funnel 102 to snap-fit to the housing 104. For additional security, the inlet funnel 102 may form a slot 118 so that the inlet funnel 102 may also be screwed to the housing 104. The flapper assembly 170 includes a square flap 172 mounted on a hinge post 174. The hinge post 174 rotatably mounts inside the central portion 120 of the housing 104 so that the flap 172 selectively substantially blocks the passageway 106 in the normal position. Preferably, the flap 172 is spring biased into the normal position. The hinge post 174 preferably has a flat surface for stably mounting the flap 172. Each end 176 of the hinge post is circular and sized to fit in a respective bore 130 formed in the housing 104. Each end 176 also preferably defines an annular ridge for receiving a locking ring (not shown) to retain the hinge post 174 rotationally mounted in the bores 130. In another embodiment, a transverse bore and cotter pin are used instead of an annular ridge and locking ring.

The flap 172 also includes a plurality of conductive traces 178 on an upper side. The conductive traces 178 electrically connect to the pcb assembly 140 to generate the low flow error signal. The conductive traces 178 may be co-planer inter-digitated fingers of an electrically conductive material such as copper. When water contacts the traces 178, the capacitance changes so that variation in capacitance across the traces 178 may be used to determine if the traces 178 are wet. An example of such traces is shown in U.S. Pat. No. 7,753,071 issued on Jul. 13, 2010 to J. Wood, which is incorporated herein by reference. Additional circuitry for the operation of the traces 178 may be located on the lower side of the flap 172. However, it is preferred that such circuitry is mounted on the printed circuit board 142. In another embodiment, a humidity sensor or other type of sensor is mounted on the flap 172 to determine relevant fluid flow parameters.

Figure 5:
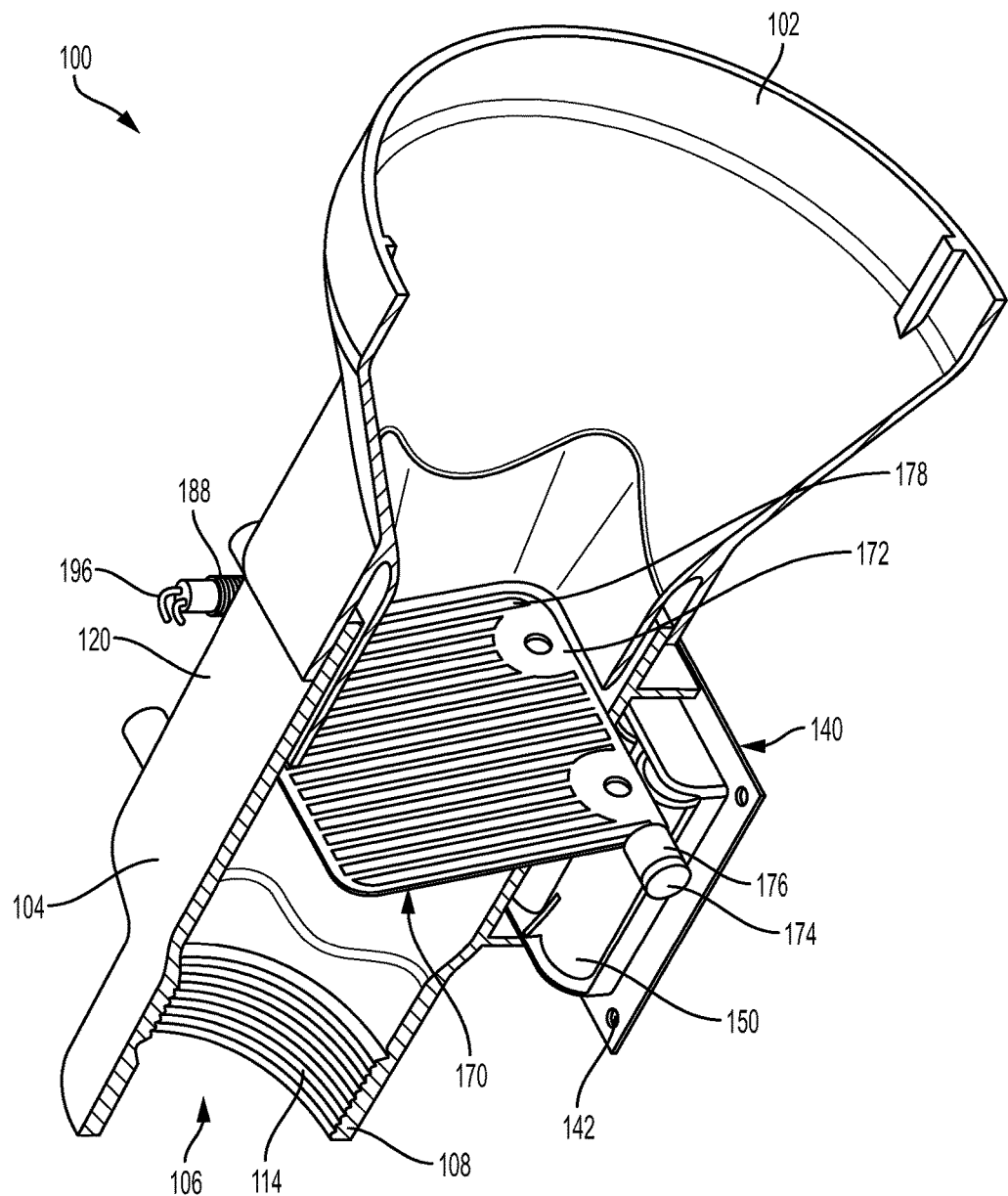
FIG. 5 is a partial cross-sectional view of a leak detector assembly in accordance with the subject disclosure.

Referring additionally to FIG. 5, a partial cross-sectional view of the assembled leak detector assembly 100 in the normal position is shown. In operation, when the backflow prevention device burps or leaks a small amount of water, the flap 172 does not move because of the biasing but the flap 172 does become wet. The moisture causes a change in capacitance that is processed by the pcb assembly 140 and main controller 180 so that the yellow LED 148a lights and the low flow error signal is generated to sound an alarm and/or forwarded as necessary. It is envisioned that service personnel may simply track to low flow error signals to determine system reliability and the like but not take further action if only the low flow error signal is generated.

The flapper assembly 170 also includes a sensor 188 to generate the fully actuated error signal. The sensor 188 threads into a sensor mount 132 formed on the housing 104. The sensor mount 132 preferably is two spaced apart brackets 134. The fully actuated error signal of the sensor 188 is carried to the pcb 142 and/or the main controller 180 by wires 196. In one embodiment, the sensor 188 is a magnetic sensor that generates the fully actuated error signal when a magnetic tip 190 of a threaded post 192 moves a certain distance away from the sensor 188. Preferably, the threaded post 192 and magnetic tip 190 are sized to pass through at least one of the brackets 134 of the sensor mount 132 to allow a wide range of adjustment of the mechanical position.

When the magnetic tip 190 is adjacent the sensor 188, the sensor 188 either generates no signal or a normal condition signal depending upon how the pcb assembly 140 and main controller 180 logic is programmed. The magnetic tip 190 moves by virtue of the post 192 being mounted on a rotating arm 194. The arm 194 is mounted on the hinge post 174 so that when the flap 172 and the hinge post 174 rotate, the magnetic tip 190 moves away from the sensor 188. It is envisioned that the arrangement of the sensor and magnet could be reversed however, it is typically more efficient to have the sensor, which requires wiring, be the stationary component.

Preferably, the post 192 threads into the arm 194 so that position of the post 192 can be adjusted to set the trip level of the flap 172. The opposing end 198 of the post 192 may be a hex head or the like so that the post 192 can be adjusted with a socket, wrench, allen wrench or screwdriver. If necessary, one or more nuts (not shown) can be threaded onto the post 192 to lock the post in position on the arm 194. Depending upon the desired setting, the post 192 can even be moved so that the flap 172 is angled with respect to the axis of the housing 104 (i.e., the direction of fluid flow).

In operation, when the backflow prevention device discharges a large amount of water, the water overcomes the bias of the flap 172, which is forced to rotate approximately 90° in the central portion 120 so that the water may flow through the passageway 106. This movement of the flap 172 and, thereby, the hinge post 174 rotates the arm 194 approximately 90° so that the magnetic tip also moves 90° away from the sensor 188. As a result, the sensor 188 switches state, the pcb assembly 140 and the main controller 180 recognize the change so that the red LED 148b lights and the fully actuated error signal is generated for appropriate action. In effect, the flap 172 does double duty because the conductive traces 178 thereon lead to the low flow error signal and movement of the flap 172 generates the fully actuated error signal.

Figure 6:
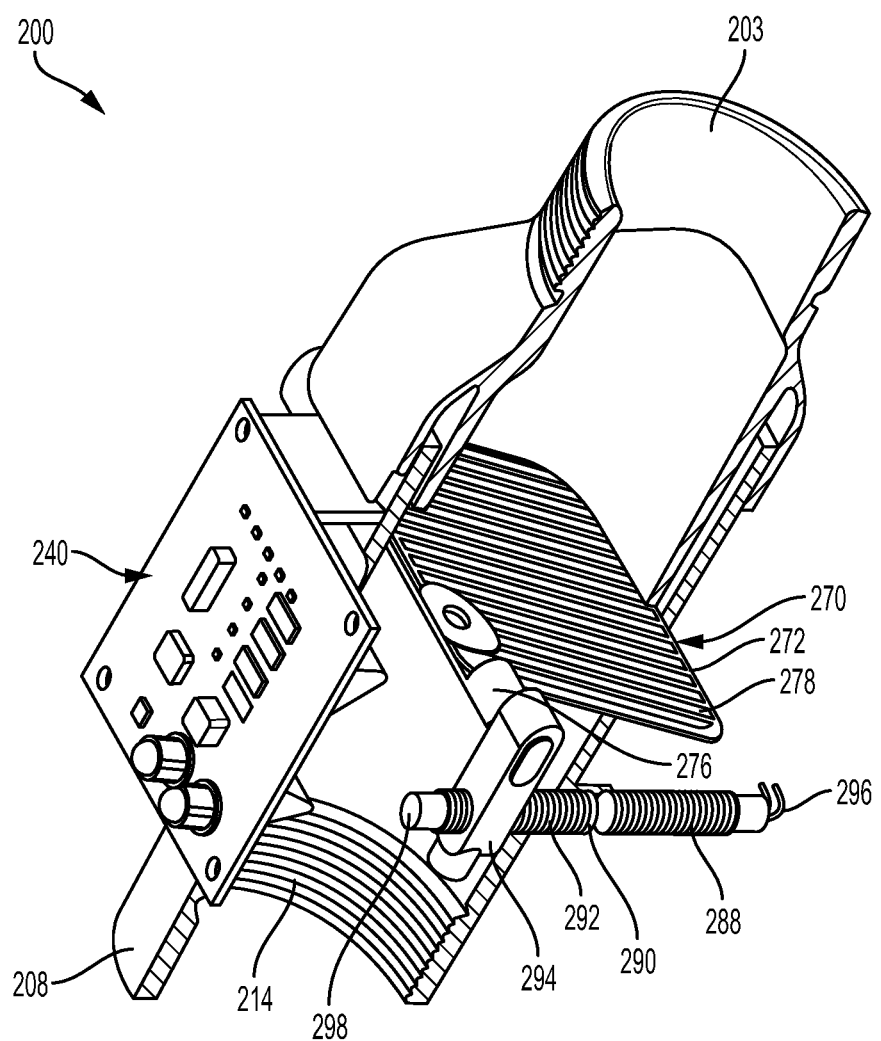
FIG. 6 is a partial cross-sectional view of another leak detector assembly in accordance with the subject disclosure.

Referring now to FIG. 6, a partial cross-sectional view of a second embodiment of a leak detector assembly 200 in accordance with the subject technology is shown. Similar elements to those described in connection with above-described embodiments are indicated with the like reference numbers but part of the 200 series instead of 100 series of numbers. Many elements are essentially the same as those of the foregoing embodiments and, thus, are not further described herein. The primary difference between the leak detector assembly 200 and the leak detector assembly 100 is the lack of an inlet funnel. Instead, the leak detector assembly 200 has a threaded top portion 203 for coupling directly to a backflow prevention device (not shown) effectively becoming a combination leak detector and backflow prevention device. An inlet funnel may still be present as part of the drain system as is often the case.

The leak detector assembly 200 is shown in the normal position. Although the flap 272 maintains the normal position, as noted above, a small amount of moisture discharge from the backflow prevention device will be sensed by the traces 278 and activate the low flow error signal. Again, as significant flow overcomes the normal position bias of the flap 272, the flap 272 rotates 90° to clear flow in the passageway 206. As a result, the magnetic tip 290 of the post 292 rotates away from the sensor 288 so that the fully actuated error signal is generated.

It is also envisioned that an inlet funnel could threadably engage the top portion of the housing 204. In an alternative embodiment, the inlet funnel is not only shaped to collect discharged water but gently direct the flow onto the flap. For example, the inlet funnel may include helical grooves that direct the fluid flow around the housing axis before reaching the flap. Additionally, a screen or shower head device above the flap may disburse the energy of the fluid in order to elevate the required flow for full actuation. The inlet funnel may also include an absorptive material so that fluid discharge needs to be in excess of the absorption capacity before the low flow error signal is generated. In one embodiment, the main controller is able to reset operation (e.g., bleeding and clearing errors etc.) in the event of a low flow error signal.

In another embodiment, the normal or rest position of the flapper assembly is varied according to user preference. For example, in the normal position, the flap can be at 45° with respect to the horizon. As a result, the flap will shed drips effectively so that moisture does not puddle on the flap. In another embodiment, the flap 372 rests at 30° to the horizon.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, printed circuit boards, main controllers, computers, arms, couplings and the like) shown as distinct for purposes of illustration may be incorporated within other functional elements in a particular implementation. For example, the main controller may be incorporated into the printed circuit board, logic programmed on memory for execution by a processor may be hard wired in a circuit, and the like.

Further, although the subject technology has been described with respect to the field of water systems, it is envisioned that the subject technology would be equally applicable to other fields and applications such as chemical systems with gas or liquid. The subject technology also has broad application in the field of water systems. For example, the subject technology may be utilized with backflow prevention assemblies, relief valve discharge assemblies, actual cash value (ACV) floor protection sensing technology, water quality products, intelligent drains that monitor plugging, and the like.

While the subject technology has been described with respect to preferred embodiments, those skilled in the art will readily appreciate that various changes and/or modifications can be made to the subject technology without departing from the spirit or scope of the invention as defined by the appended claims. For example, each claim may depend from any or all claims in a multiple dependent manner even though such has not been originally claimed.

What is claimed is:

1. A leak detector assembly comprising:
a housing defining a passageway for receiving a fluid; and
a flap assembly coupled to the housing, the flap assembly including:
   a first post,
   a flap,
   a rotating arm,
   a second post,
   a first flow sensor, and
   a second flow sensor,
   wherein the flap is mounted to the first post, the second post is connected to the first post by the rotating arm, the first flow sensor is configured to detect a low flow of fluid from the passageway through the flap and generate a low flow error signal, and the second flow sensor is configured to detect a high flow of fluid from the passageway through the flap and generate a high flow error signal.

2. The leak detector assembly of claim 1, further comprising a printed circuit board for processing at least one of the high flow error signal and the low flow error signal.

3. The leak detector assembly of claim 1, further comprising a main controller connected to the flap assembly for providing wireless communication of the low flow and high flow error signals.

4. The leak detector assembly of claim 1, further comprising a main controller connected to the flap assembly for storing a date, time and duration of each of the low flow and high flow error signals.

5. The leak detector assembly of claim 1, wherein the flap assembly further includes: a magnet coupled to the second post; and a third post, wherein the second flow sensor is a fixed magnetic sensor located on the third post and configured to generate the high flow error signal based upon the magnet on the second post moving away from the fixed magnetic sensor on the third post.

6. The leak detector assembly of claim 5, wherein one of the magnet and the fixed magnetic sensor is mechanically adjustable to adjust a set point for the high flow error signal.

7. The leak detector assembly of claim 1, wherein the first flow sensor includes a sensing element on the flap that is co-planar inter-digitated conductive traces connected to a printed circuit board.

8. The leak detector assembly of claim 1, wherein the flap is mounted on the first post to allow 90° of rotation in the housing.

9. The leak detector assembly of claim 1, wherein the flap is mounted on the first post substantially perpendicular to the passageway when neither the low flow nor high flow error signals are activated.

10. The leak detector assembly of claim 1, wherein the flap is mounted on the first post at an angle of 45° with respect to an axis of the passageway.

11. The leak detector assembly of claim 1, wherein the flap is mounted on the first post at an angle of 30° with respect to an axis of the passageway.

12. The leak detector assembly of claim 1, further comprising a screen in the passageway upstream of the flap for disbursing energy of the fluid.

13. The leak detector assembly of claim 1, further comprising an absorptive material in the passageway upstream of the flap.

14. The leak detector assembly of claim 1, wherein the rotating arm and the second post are positioned on an exterior surface of the housing.

15. The leak detector assembly of claim 5, wherein the third post is positioned on an exterior surface of the housing proximate to the second post.

16. A leak detector assembly comprising:
- a housing defining a passageway for receiving a fluid; and
- a flap assembly coupled to the housing, the flap assembly including:
  - a flap mounted for rotation so that the fluid in the passageway is directed to the flap;
  - a first flow sensor on the flap for generating a low flow error signal without movement of the flap when a low flow of the fluid from the passageway wets the first flow sensor; and
  - a second flow sensor mounted for rotation with the flap for generating a high flow error signal based on movement of the flap as a result of a high flow of the fluid from the passageway hitting the flap.

* * * * *